UNITED STATES PATENT OFFICE.

RALPH E. RICH, OF CHICAGO, ILLINOIS.

BEARING MATERIAL AND PROCESS OF PRODUCING THE SAME.

1,198,152.   Specification of Letters Patent.   Patented Sept. 12, 1916.

No Drawing.   Application filed April 17, 1915.   Serial No. 22,047.

*To all whom it may concern:*

Be it known that I, RALPH EUGENE RICH, a citizen of the United States, and a resident of Chicago, in the county of Cook, State of Illinois, have invented a new and useful Improvement in Bearing Material and Processes for Producing the Same, of which the following is a specification.

My invention consists of an improved self-lubricating bearing material and the process for producing the same and the object of my invention is to produce a material containing a lubricant evenly diffused throughout the mass.

The process consists of mixing a prepared lubricant with a metal, alloy or other substance while the latter is in a molten state. For the sake of brevity the latter substance will be hereafter termed the vehicle and it will be understood that any substance, mixture or compound having the requisite qualities may be used in this connection with this invention.

The process of mixing a coated lubricant with a metal as set forth in Patent No. 1,022,465 to Raymond T. Cole is improved and rendered practicable by the invention hereinafter set forth.

The difficulty heretofore encountered in this art and which this invention obviates has been to produce an even and uniform distribution of the lubricant throughout the composition.

In my process a vehicle suitable to the purpose in hand is first selected and its melting temperature and specific gravity are determined. A suitable lubricant is then pulverized or granulated by some convenient process and coated either by electroplating or other process, once or successively as may be necessary, with some metal, alloy or substance having a higher melting point than that of the vehicle and a specific gravity such that the specific gravity of the resulting coated lubricant will be the same or approximately the same as that of the vehicle. The coated lubricant is then thoroughly mixed with the vehicle while the latter is in a molten condition and the resulting composition poured off into suitable molds.

By making the specific gravity of the prepared lubricant the same or approximately the same as the specific gravity of the vehicle it is possible to produce an even diffusion of the lubricant throughout the resulting mass and to avoid a heavy proportion of lubricant either at the top or bottom due to floating or settling while the vehicle is still fluid or semi-fluid.

A specific example of a suitable combination of materials which experiment has demonstrated adapted to above process is as follows: graphite sp. gr. 2.2 heavily plated with lead sp. gr. 11.4 distributed through Babbitt metal sp. gr. 8. My experiments indicate that the lowest specific gravity of the plated graphite necessary to prevent flotation is 6.8 which would require a proportion of approximately 6 parts of lead to 1 part of graphite. Lead being a soft metal this proportion is not objectionable in the resulting compound.

Having thus fully described by improved process and the character of my improved product, I claim:

1. The process of making an improved bearing composition consisting of coating once or successively a suitable lubricant in a pulverized or granulated condition with a suitable metal alloy or substance having a relatively high fusion temperature and adapted to produce with said lubricant a predetermined specific gravity; mixing said coated lubricant with a molten metal, alloy or substance having a relatively low fusion temperature and a specific gravity the same or approximately the same as that determined for the coated lubricant, and allowing the resulting composition to cool in suitable molds.

2. An improved self-lubricating composition composed of a lubricant, a coating upon said lubricant of a relatively high fusion temperature and adapted to produce in combination with said lubricant a predetermined specific gravity, said lubricant and coating being evenly diffused throughout a suitable vehicle having a relatively low fusion temperature and the same or approximately the same specific gravity as that of the combined lubricant and coating.

3. An improved self-lubricating composition consisting of graphite particles heavily coated with lead to produce a specific gravity of at least 6.8 distributed throughout a mass of Babbitt metal while the latter is molten and allowed to cool therein.

RALPH E. RICH.

Witnesses:
J. W. BROOKS LADD,
SIDNEY I. BESSELIEVRE.